Figure 1:
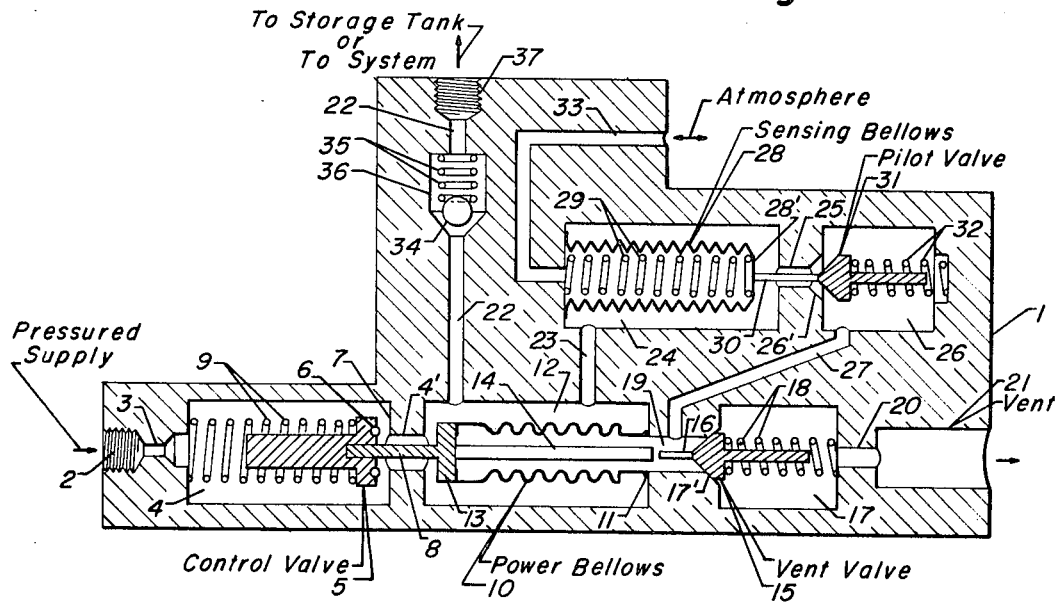

United States Patent

Breunich et al.

[19]

[11] 3,722,534
[45] Mar. 27, 1973

[54] FLOW CONTROL VALVE SYSTEM WITH RAPID CLOSING VALVE

[75] Inventors: Theodore R. Breunich, Stamford; August J. Hildenbrandt, Jr., Fairfield, both of Conn.

[73] Assignee: Universal Oil Products Company, Des Plaines, Ill.

[22] Filed: Oct. 12, 1971

[21] Appl. No.: 188,276

[52] U.S. Cl. .................................................137/488
[51] Int. Cl. ........................F16k 31/12, F16k 17/02
[58] Field of Search ........................................137/488

[56] References Cited

UNITED STATES PATENTS 3,007,492  11/1961  Grimmer ........................137/488 X Primary Examiner—Henry T. Klinksiek
Attorney—James R. Hoatson, Jr. et al.

[57] ABSTRACT

A flow control system providing for rapid closure of an inlet valve through the use of power control bellows or diaphragm means and auxiliary sensing bellows, pilot valve and vent valve means. The sensing bellows is precalibrated to move responsive to reaching a predetermined pressure level and then trigger a partial retraction of the control bellows and an opening of a vent valve which latter action effects a rapid closing of the main inlet valve.

9 Claims, 2 Drawing Figures

PATENTED MAR 27 1973 3,722,534

FLOW CONTROL VALVE SYSTEM WITH RAPID CLOSING VALVE

This invention relates to a pressure controlled valving system and more particularly to an arrangement providing for the rapid closing of a main fluid inlet valve. It is recognized that there are many types of control systems for the operation of valves and, also, that valves may have rapid action in opening or closing movements such as from the operation of a solenoid, a diaphragm, hydraulic piston, or whatever. However, the present system provides a special arrangement that includes a precalibrated sensing bellows or diaphragm to trigger the operation of a control bellows, which is connective with a venting valve whereby the opening of the latter permits a rapid and large pressure differential across the control bellows and an accompanying rapid closure of the main inlet valve.

It may be considered to be a principal object of the present invention to provide a controlled and regulated valving system whereby fluid can be charged at high pressure into a pressurized receiver and rapidly closed down when a predetermined pressure level is attained.

It is also an object of the present invention to provide a regulated refill system whereby fluid can be recharged to a pressure chamber and also withdrawn therefrom in a controlled manner as for example, such as the refilling of an oxygen cylinder which in turn can be used to supply oxygen to an airplane crew. There are many processes, or various types of fluid supply installations which can require the flow of a gas or liquid into a pressured storage reservoir or tank and then have a subsequent withdrawal of such fluid medium to a "use" station or zone and it is, therefore, not intended to limit the present invention to only the handling of air or oxygen to a crew oxygen tank.

In one embodiment, the present invention provides a fluid flow control valve system providing for rapid closure of the fluid inlet flow, which comprises in combination: (a) a fluid control valve with a movable valve member therein; (b) a fluid inlet to said control valve being positioned to have flow therethrough in the same direction as the closure movement of said valve member; (c) a fluid outlet passageway from said valve and from said system; (d) a control power bellows means having a movable portion connective to said control valve to hold it open for fluid flow conditions; (e) passageway means connecting said fluid outlet passageway to a first chamber positioned on a first side portion of said power bellows means and additionally connecting said outlet to a second chamber; (f) a spring biased sensing bellows means in said second chamber, with such biasing being of predetermined magnitude and opposing the inlet fluid pressure from said passageway means to said second chamber; (g) a spring biased pilot valve member and connector means between such valve member and the movable end of said sensing bellows means; (h) additional fluid passageway means from said second chamber connective to said pilot valve chamber and from the latter to a second side of said control bellows means opposite said first chamber; and (i) a vent valve member biased to a normally closed position and communicative with said second side of said control power bellows and to a venting outlet, whereby the reaching of a predetermined pressure on the sensing bellows means permits the closing of said pilot valve and a partial movement of said power bellows means to open said vent valve and then create a large pressure differential across such power bellows means and said control valve to thereby effect the rapid closing of the latter.

In a more specific aspect, the present invention is of advantage in providing for a high pressure system where there is a periodic refill of a tank, cylinder or other reservoir means from which the fluid material is subsequently utilized in a process or consuming system. In connection with the filling of a tank or reservoir, there will be the utilization of a check valve means in the outlet from the refill control system such that as fluid is utilized from the reservoir there will be substantially no back flow through the principal control valve system. Additionally, the system fluid will pass through a regulator valve which, in turn, is controlled by suitable biasing means such that there is a predetermined pressure range for the fluid passing to the use system.

In the present flow control system, a preferred apparatus arrangement positions all of the various valve and bellows means into one housing and additionally provides that the main control valve, the power bellows means and the vent valve are all in axial alignment whereby a rod or other member connecting to and passing through the power bellows means can readily contact or connect with the control valve and the vent valve means. In other words, a holding rod from the power bellows means can serve to axially push against the control valve member and hold it open during a processing or filling operation; and additional rod means can push against or connect with the vent valve means such that the latter can be opened when there is a pressure change from the sensing bellows to effect movement of the power bellows.

In connection with the term "bellows" or "bellows means," it is to be understood that such terms may apply to a typical bellows member with multiple corrugations or may apply to typical capsule or diaphragm element, all of which can provide movement responsive to changes in pressure and give a desired control movement within the system. Also, typically the bellows or other diaphragm means will be spring biased through the use of compression springs or tension springs so as to in turn give a desired direction of movement for closing or opening a valve member.

Reference to the accompanying drawing and the following description thereof will serve to show diagrammatically the construction and arrangement of the present improved fluid flow control system, as well as how such system may be utilized for filling a tank or reservoir from which the fluid can be subsequently withdrawn. Variations in construction and additional advantages for the use of the present system will be set forth and pointed out in connection with the further descriptive matter.

FIG. 1 of the drawing shows, in a diagrammatic manner, how the flow control system of the present invention may be utilized to provide for the passage of a high pressure fluid medium from a supply source to a fluid outlet means.

Figure 2:
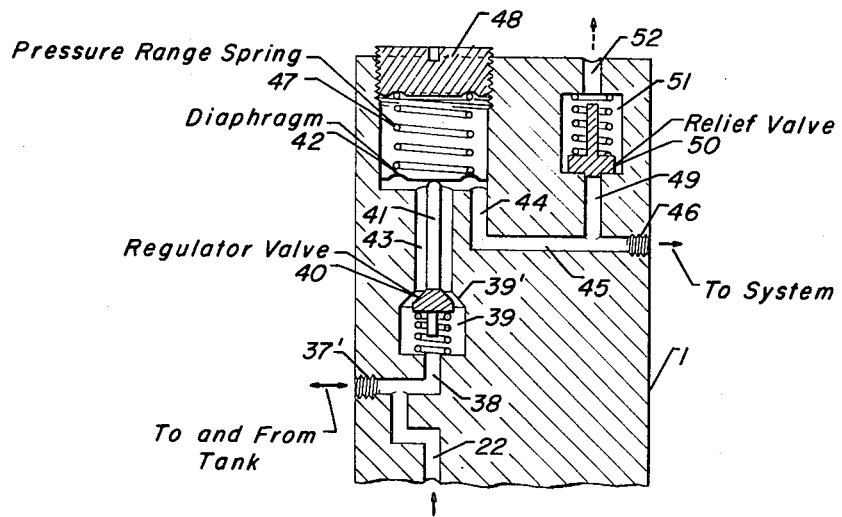

FIG. 2 of the drawing indicates diagrammatically additional regulator valve means which may be utilized in combination with the flow control system of FIG. 1 to, in turn, move the pressurized fluid from a tank to a process or "use" system.

Referring now particularly to FIG. 1 of the drawing, there is indicated diagrammatically a housing 1 having a fluid inlet port 2 in turn connective with a restricted area orifice 3 and a valve chamber 4, which houses a control valve member 5. The latter is indicated as having an O-ring or other seal member 6 adapted to bear against an end seat portion 7 of chamber 4 and thus block flow through the valve unit when a holding rod 8 is moved to permit such closing. A spring member 9 is also shown within valve chamber 4 and is provided to exert some spring biasing force against valve member 5; however, as will be pointed out hereinafter, such biasing force will be overcome by the "spring action" of the connective power bellows 10.

In alignment with control valve 5, there is provided a power bellows member 10 connected at 11 to the end of a chamber 12 and additionally has a closed end member 13. The latter connects with and holds a projecting valve holding member 8 in alignment with and against valve member 5 such that the latter may be held open during fluid flow conditions. An additional axially positioned rod member 14 is provided within the interior of bellows 10 to extend in the direction opposite holding member 8 toward a vent valve member 15 having rod means 16. For convenience, vent valve member 15 and rod 16 are maintained in axial alignment with the power bellows 10 and the control valve 5 so that there may be an interaction between the three members to effect the opening and closing down of the main control valve 5.

Diagrammatically, vent valve member 15 is shown as being within a valve chamber 17 adapted to hold spring biasing means 18 such that valve member 15 is normally in a closed position. When fluid is permitted to be vented to the atmosphere, there is flow through passageway means 19 to chamber 17 and then through orifice 20 into outlet means 21. As will hereinafter be set forth more fully, vent valve means 15 is utilized to decrease pressure within bellows member 10 such that there can be a fast pressure differential build-up across such bellows and a rapid movement thereof to in turn permit a rapid closure of control valve member 5. Separate spring biasing can be used to hold power bellows 10 to a normally opened position; however, preferably, the bellows 10 can also be constructed to have an inherent spring action which is strong enough to hold valve member 5 in a normally open position against spring means 9.

During fluid flow conditions, the fluid entering inlet port 2 will pass through orifice means 3, valve chamber 4, passageway 4', chamber 12 and fluid outlet passageway 22, as well as into a fluid passageway 23, bellows chamber 24, passageway 25, pilot valve chamber 26 and passageway 27 whereby fluid pressure can then enter the interior of power bellows 10 from passageway 19. This arrangement provides for pressurized flow through substantially the entire valving system and the normal full expansion of power bellows 10 such that holding rod 8 is in contact with the face of control valve member 5 to hold the latter open during fluid flow conditions. However, as hereinbefore noted and as will be more fully explained in connection with FIG. 1, there can be a partial contraction of power bellows 10 to open vent valve member 15, all subject to the operative movement of a sensing bellows 28 within chamber 24.

Sensing bellows 28 is provided with suitable biasing means such as spring 29, internally thereof, which will provide a precalibrated or predetermined positioning of bellows member 28 as well as a pressure resistant force to preclude any easy compressive movement of the closed end portion 28' of such bellows. In other words, the bellows 28, through its end portion 28' and rod means 30, connective to a pilot valve member 31 in chamber 26, will hold the latter valve open until such time as a predetermined high pressure range is reached, at which time bellows 28 will contract sufficiently to permit the seating of pilot valve 31 against a seat portion 26', in chamber 26. A spring member 32 is also provided in the latter chamber to assist in the closing of pilot valve 31 as bellows member 28 contracts. Upon the contraction of bellows 28 and the seating of pilot valve member 31, it will be seen that fluid will cease flowing through passageway 27 and into the interior of power bellows 10. This action in turn permits a contraction of bellows 10 and a cracking open of vent valve 15 from its seat portion 17', whereby pressurized fluid from the interior of the power bellows 10 and from passageway 27 will escape by way of orifice 20 and vent opening 21. This action, in turn, creates a large pressure differential across the power bellows and a rapid contraction of such bellows whereby the holding member 8 moves away from the face of control valve 5 to permit the latter to seat against face 7 of chamber 4 and effect a stoppage of fluid flow through the system.

It should be noted, in a preferred design of the unit, that there should be a larger surface area, or peripheral area, provided for control valve member 5 than is provided for the cross-sectional area of orifice 3 on the inlet side of valve chamber 4, whereby the fluid inlet pressure can help effect a rapid closure of the valve 5 upon the contraction of power bellows 10, which in turn is caused, as heretofore stated, by the loss of internal pressure from fluid flow by way of pilot valve chamber 26 and passageway 27 to passageway 19.

It may also be noted that the diagrammatic embodiment of FIG. 1 provides for an atmospheric passageway 33 from the interior portion of sensing bellows 28 such that the latter can readily contract or expand responsive to the external gage pressure, as provided in the chamber 24. However, in an alternative design, the interior 29 of bellows 28 could be evacuated and the sensing bellows made operative to respond to an "absolute" pressure differential.

In FIG. 1, there is further indicated the utilization of a ball check valve member 34 with spring biasing means 35 in a valve chamber 36 as a part of the fluid outlet passageway 22 such that fluid reaching outlet port means 37 and entering a pressurized storage tank or processing system will not have a reverse flow back into the passageway 22 and around bellows 10 or other portions of the valving system after fluid flow has been cut from the supply source at inlet 2.

Where oxygen, nitrogen or other generally harmless gaseous fluid is utilized through the valving system, the venting outlet 21 may be such as to vent directly to the atmosphere; however, in the event that a liquid or harmful material is being charged through the valve system then a suitable drainage or receiving means should be connected to the vent outlet 21 to preclude atmospheric contamination. It may also be noted that the arrangement and the parts shown diagrammatically in FIG. 1 should not be considered limited inasmuch as other equivalent types of construction may well be utilized to meet the disclosed operation and be within the scope of the present invention. For example, various forms or types of valve members and valve seats may well be incorporated in a given embodiment, or alternatively, various types of bellows and diaphragms may well be provided to result in the desired movements responsive to pressure that will in turn effect the desired valve closures or openings to effect the stopping and starting of fluid flow through the system.

In FIG. 2 of the drawing there is indicated additional regulator valve means which may be provided with the valving system of FIG. 1 so as to illustrate how the fluid may be passed to a storage tank "T" from passageway 22 and outlet 37 and then be withdrawn from such supply tank to be transferred at a regulated pressure level to a point of use. Specifically, with respect to FIG. 2, there is indicated diagrammatically an extended housing portion 1' which is adapted to have a continuation of passageway means 22 (as shown in FIG. 1) which can carry the fluid medium to a cylinder or storage tank "T" by way of outlet 37' and additional passageway means 38. The latter in turn connects with a valve chamber 39 having a regulator valve member 40 adapted to fit against a seating portion 39'. Valve 40 also has an enlongated connector rod portion 41 which contacts a movable and adjustable diaphragm member 42. Additional passageway means 43, around rod 41, connects with passageway means 44 and 45 to reach outlet means 46 which in turn will connect with a "use" station or system.

It is to be understood that the check valve means in passageway 22 will be closed during such times as the fluid flow takes place from tank means at port means 37' to carry through the valve chamber 39 and additional passageway means 43, 44 and 45. Also, in order to provide a stabilized pressure level for the flow through the passageway to the outlet, there can be adjustable regulation of regulator valve 40 through the adjusting and biasing of diaphragm 42 from a pressure range spring 47. The latter is shown as being held in place by adjustment screw member 48 so that there can be some variation in the spring biasing force. In other words, subject to the positioning or compressioning of spring 47 against diaphragm 42 there will be the desired positioning of valve member 40 through connecting rod 41, to stabilize the fluid flow through the regulator valve to the outlet 46 and to the system. It can be seen that as pressure increases there will be an upward action against diaphragm 42 and a resulting further closing of valve member 40 so as to stabilize the pressurized flow to the system.

For safety purposes, the embodiment of FIG. 2 shows an additional passageway means 49 that can be provided from passageway 45 to connect with a pressure relief valve 50 and chamber 51 which in turn communicates with a pressure release opening 52.

As an example of utility, the present valving system and regulated fluid outlet flow may well be utilized in connection with oxygen storage in an aircraft for use by crew members, or others, in the aircraft. More specifically, oxygen can be supplied periodically from a pressure supply source at inlet 2 (FIG. 1) to carry through the control valve chamber 4 and into passageway 22 and through check valve 34 to in turn be discharged into a storage cylinder or other reservoir means "T" (in FIG. 2). After the storage cylinder has received sufficient oxygen to reach a predetermined level, say approximately 2,000 psi, then there can be a movement of the sensing bellows to in turn provide that power bellows 10 will permit the closing of the main control valve 5, as hereinbefore set forth. Upon the stoppage of the fluid flow into passageway means 22 and to outlet means 37, there will be sufficient back pressure from the storage tank "T" by way of backflow into passageway 22 to cause a seating of ball check valve 34, whereby the storage tank or reservoir is ready for use in supplying pressurized oxygen to the crew system. Then, as described in connection with FIG. 2, oxygen may be withdrawn from the storage tank by way of passageway 38, regulator valve means 40 and the additional passageway means 43, 44 and 45 to reach the crew system at a regulated pressure level.

Again, it should be noted that the regulator valve construction and the pressure regulating diaphragm means 42 are merely diagrammatic and other equivalent forms of control valve constructions and throttling means may well be utilized to control flow to a given system. Still further, it is to be noted that the present fluid flow control system need not be limited to a gaseous medium inasmuch as water or other fluids may well be subject to the same type of fluid control system in connection with a given processing operation.

We claim as our invention:

1. A fluid flow control valve system providing for rapid closure of the fluid inlet flow, which comprises in combination:
    a. a fluid control valve with a movable valve member therein;
    b. a fluid inlet to said control valve being positioned to have flow therethrough in the same direction as the closure movement of said valve member;
    c. a fluid outlet passageway from said valve and from said system;
    d. a control power bellows means having a movable portion connective to said valve member of said control valve to hold it open for fluid flow conditions;
    e. passageway means connecting said fluid outlet passageway to a first chamber positioned on a first side portion of said power bellows means and additionally connecting said outlet to a second chamber;
    f. a spring biased sensing bellows means in said second chamber, with such biasing being of predetermined magnitude and opposing the inlet fluid pressure from said passageway means to said second chamber;
    g. a spring biased pilot valve member in a pilot valve chamber and connector means between such valve member and the movable end of said sensing bellows means;
    h. additional fluid passageway means from said second chamber connective to said pilot valve chamber and from the latter to a second side of said control bellows means opposite said first chamber; and i. a vent valve member biased to a normally closed position and communicative with said second side of said control power bellows and to a venting outlet; whereby the reaching of a predetermined pressure on the sensing bellows means permits the closing of said pilot valve and a partial movement of said power bellows means to open said vent valve and then create a large pressure differential across such power bellows means and said control valve to thereby effect the rapid closing of the latter.

2. The fluid flow control valve system of claim 1 further characterized in that a restricted area orifice is provided in said fluid inlet to said control valve and such orifice is of substantially smaller cross-sectional area than the area provided by said movable valve member in said control valve whereby to provide a rapid closure of the latter as said control power bellows and the connection to said valve member moves away from the latter.

3. The fluid flow control valve system of claim 1 further characterized in that said power bellows means and said vent valve member are maintained in axial alignment with said control valve whereby to provide axial interconnection between the valve means and the bellows means.

4. The fluid flow control valve system of claim 3 still further characterized in that rod type connection means are provided between said power bellows means and said control valve and with said vent valve member, whereby there is a direct axial movement of all three members simultaneously.

5. The fluid flow control valve system of claim 1 further characterized in that additional passageway means connects from said fluid outlet passageway to be connective with a fluid receiving means and a backflow check valve means is positioned in combination with such passageway means to preclude back-flow through the valve system after fluid flow is stopped through the fluid control valve.

6. The fluid flow control valve system of claim 1 further characterized in that the fluid outlet passageway from the fluid control valve is connected with additional passageway means in turn connective with a spring biased regulator valve section and an outlet from the latter provides for discharge of a regulated fluid flow to a use system.

7. The fluid flow control valve system of claim 6 still further characterized in that said regulator valve section is provided with a movable diaphragm member connective with a valve member of such section and an adjustably biased pressure range control spring is in contact with said diaphragm to provide adjustment of the latter to in turn provide a regulated pressure level for fluid passing through said regulator valve section.

8. The fluid flow control valve system of claim 1 further characterized in that an atmospheric passageway is provided to the side of said biased sensing bellows means opposite said second chamber, whereby said bellows means can compress responsive to a differential gage pressure.

9. The fluid flow control valve system of claim 1 further characterized in that the side of said biased sensing bellows means opposite said second chamber is evacuated to provide a vacuum condition, whereby said bellows means can compress responsive to absolute pressure.

* * * * *